United States Patent [19]

Mitchell

[11] 4,304,258

[45] Dec. 8, 1981

[54] SOLENOID VALVE ASSEMBLY

[75] Inventor: John D. Mitchell, Phoenix, Ariz.

[73] Assignee: The Garrett Corporation, Los Angeles, Calif.

[21] Appl. No.: 85,152

[22] Filed: Oct. 15, 1979

[51] Int. Cl.³ .................. F16K 11/14; F16K 31/02
[52] U.S. Cl. ................. 137/596.17; 251/76; 251/129; 251/332
[58] Field of Search ............ 137/596.17; 251/76, 251/129, 332

[56] References Cited

U.S. PATENT DOCUMENTS 2,930,404  3/1960  Kowalski ............... 251/129 X
2,982,515  5/1961  Rule .
3,949,964  4/1976  Freeman .

FOREIGN PATENT DOCUMENTS 640078  12/1978  U.S.S.R. ............... 137/596.17

*Primary Examiner*—Gerald A. Michalsky
*Attorney, Agent, or Firm*—James W. McFarland

[57] ABSTRACT

A solenoid valve assembly including a movable armature acting through a lost motion unit for moving a valve member to an open position. The lost motion unit stores armature stroke energy during an initial stage of armature stroke, and sums the stored energy with armature stroke energy during a latter stage of armature stroke to open the valve member.

14 Claims, 2 Drawing Figures

SOLENOID VALVE ASSEMBLY

BACKGROUND OF THE INVENTION

The subject matter herein relates to the subject matter of concurrently filed application Ser. No. 85,151, filed Oct. 15, 1979, entitled "Pressure Regulator System".

This invention relates to solenoid valve assemblies. More particularly, this invention relates to an improved solenoid valve assembly including means for optimizing the capacity of a relatively small solenoid to open a relatively high pressure valve member.

Solenoid valve assemblies in general are well known in the art. These solenoid valve assemblies typically comprise an electric core which is energizable to displace magnetically an armature through a generally linear stroke path of predetermined length. The armature cooperates with a suitable valve member to shift the valve member upon energization of the solenoid from an open to a closed position, or vice versa, as desired.

Solenoid valve assemblies are used in a wide variety of hydraulic and/or pneumatic system applications wherein the valve member opens and closes a path to fluid flow. In these applications, the valve member is subjected to a prescribed system pressure differential when in a closed position, whereby the solenoid valve assembly is designed to provide sufficient opening forces to overcome this pressure differential in order to move the valve member to an open position. Clearly, it is desirable to design the winding and armature of the solenoid valve assembly to have a minimum size to reduce electrical power requirements and attendant heating of the unit. However, it is well known that the force output of a solenoid armature is relatively small upon initiation of stroke movement, and increases with stroke length. In contrast, opening movement of the valve member requires maximum force application during initial lifting of the valve member from a valve seat, and decreases with further movement of the valve member away from the valve seat.

In the prior art, many solenoid valve assemblies are designed to provide an opening force during initial armature stroke which is sufficient to lift the valve member from a valve seat. This results in a relatively oversized winding and armature with excessive power consumption and heating. These problems are particularly pronounced when the solenoid valve assembly is used in relatively high pressure fluid systems, such as pressure activated starting systems for gas turbine machines, pneumatic gun drives, and the like, wherein the pressure differential across the valve member is on the order of several thousand p.s.i.

Some prior art systems have attempted to overcome the inherent force-stroke mismatch between the solenoid valve assembly and the associated valve member by using a so-called impact solenoid. The impact solenoid comprises a movable armature which cooperates with the valve member through limited lost motion apparatus. With these devices, the armature does not engage the valve member for opening movement until the latter, higher force stages of armature stroke to allow use of relatively smaller solenoid components to open the valve member. See, for example, U.S. Pat. Nos. 2,612,188; 2,735,644; 3,043,336; 3,450,353; 3,473,780 and 3,974,998. However, these impact solenoid designs still have not maximized the capacity of a relatively small and inexpensive solenoid valve assembly to operate a valve member.

The present invention overcomes the problems and disadvantages of the prior art by providing an improved solenoid valve assembly including means for maximizing the capacity of the solenoid to move a valve member to an open position.

SUMMARY OF THE INVENTION

In accordance with the invention, an improved solenoid valve assembly is provided for operating a valve member situated for controlling flow of a fluid under pressure. The solenoid valve assembly includes electrically controlled armature means for impacting the valve member to shift the valve member to an open position allowing flow of the pressurized fluid. More specifically, the armature means comprises an armature operably associated with a lost motion unit including a valve actuator and an energy storage spring. Movement of the armature through an initial stage of armature stroke moves the valve actuator to compress the spring for storing energy in the spring. Movement of the armature through a latter stage of the armature stroke moves the valve actuator to impact the valve member, and this impact energy sums with energy stored by the spring to provide sufficient force to lift the valve member from its associated valve seat. Upon lifting of the valve member from the valve seat, sufficient stored energy remains in the now-expanding spring to complete opening movement of the valve member.

BRIEF DESCRIPTION OF THE DRAWINGS

The accompanying drawings illustrate the invention. In such drawings.

DETAILED DESCRIPTION OF THE PREFERRED EMBODIMENT

Figure 1:
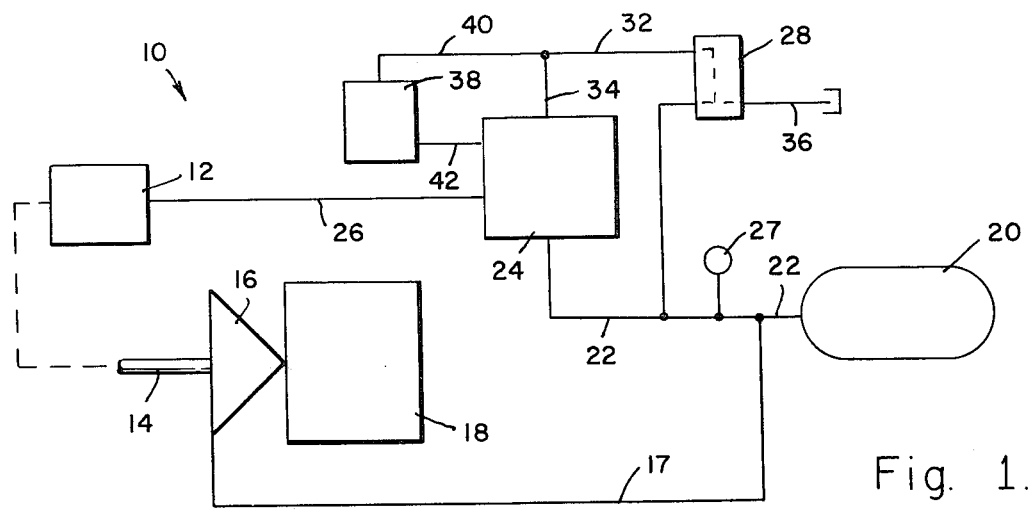
FIG. 1 is a schematic diagram illustrating a pneumatic starting system for a gas turbine machine, including the solenoid valve assembly of this invention.

The solenoid valve assembly 28 of this invention is shown schematically in FIG. 1 incorporated into an exemplary fluid pressure system requiring the solenoid valve assembly 28 for control thereof. As shown, the fluid pressure system comprises a pneumatic self-contained starting system 10 for a gas turbine. The starting system 10 generally comprises a rotatable starter motor 12 for rotatably driving a shaft 14 coupled to the compressor 16 of a gas turbine machine 18. Rotation of the compressor 16 develops compressed fluid discharged by the compressor which ultimately assists the gas turbine machine 18 in reaching continued self-sustained operation. Of course, when self-sustained operation is reached, the starter motor 12 may be suitably disconnected from the shaft 14 as by an overriding clutch (not shown) or the like for disconnecting the starting system 10 from the gas turbine machine 18.

The starter motor 12 is fluid-driven by a pressurized source of fluid provided from a portable supply tank or reservoir 20. The fluid in the supply reservoir 20 is typically at a relatively high pressure level, say on the order of about 4,000 p.s.i., and is initially supplied as by a conduit 22 to a pressure reduction regulator 24. The reduction regulator 24 suitably reduces the pressure level of the fluid to a stable pressure on the order of about 400 p.s.i. for supply to the starter motor 12 as by a conduit 26. While the specific construction of the reduction regulator 24 is not shown or described herein, a regulator construction such as that disclosed in copending application Ser. No. 85,151 is preferred. Conveniently, a meter 27 may be provided along the conduit 22 for monitoring the pressure level of fluid in the reservoir 20, and a return conduit 17 connects between the compressor 16 and the reservoir 20 to replenish the reservoir with bleed air after the machine 18 is started.

The pressure reduction regulator 24 is actuated for supply of fluid to the starter motor 12 by the solenoid valve assembly 28 of this invention. This valve assembly 28 is also coupled to the fluid supply reservoir 20 as by a high pressure conduit 30, and operates to control coupling of the high pressure fluid to an upper chamber (not shown) of the pressure reduction regulator 24 as by conduits 32 and 34. More specifically, during operation of the starting system, the solenoid valve assembly 28 couples the high pressure supply fluid to the upper chamber, and when the starting system is disabled the solenoid valve assembly couples this upper chamber to atmosphere via a vent 36. Moreover, during operation of the system, the solenoid valve assembly 28 couples high pressure fluid to a static reference pressure regulator 38 as by a conduit 40, and this device serves to provide a static regulated reference pressure to the pressure reduction regulator 24 by a conduit 42 for closely controlling operation of the reduction regulator 24, all as described in detail in copending application Ser. No. 85,151.

While the components of the system 10 of FIG. 1, are illustrated in the form of a pressure activated starting system for a gas turbine machine, it should be understood that the components are applicable to a variety of pressure systems. More specifically, the components are particulary suited for use whenever a relatively low regulated fluid pressure is required from a relatively high pressure fluid source. The solenoid valve assembly 28 of this invention has application to a wide variety of fluid pressure systems wherein control of fluid flow along a conduit or flow path is desired.

Figure 2:
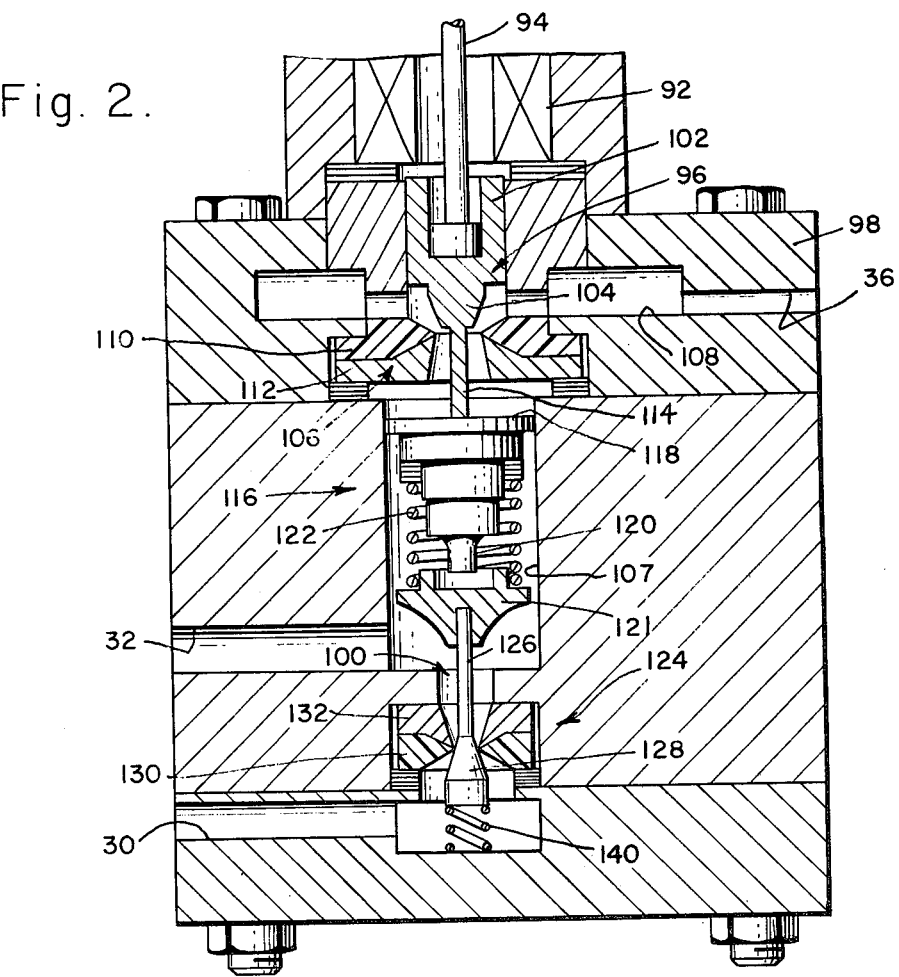
FIG. 2 is a vertical section, partially fragmented, of the solenoid valve assembly.

The solenoid valve assembly 28 of this invention is shown in detail in FIG. 2. As shown, the solenoid valve assembly 28 includes a solenoid winding 92 and a movable armature 94 which is magnetically shifted by means of control of electrical current in the winding 92, in a well known manner. The armature 94 operates a vent valve 96 carried in an upper portion of a valve body 98 for closing the vent conduit 36, and at the same time operates a high pressure valve 100 for opening communication between the high pressure inlet conduit 30 and the outlet conduit 32.

More specifically, the vent valve 96 includes a hollow base 102 into which the armature 94 is received in bearing engagement with the valve 96. When the armature 94 is shifted downwardly as viewed in FIG. 2, a valve member 104 of generally conical cross section formed integrally with the hollow base 102 is moved into sealing engagement with an associated valve seat 106. Contact with the valve seat 106 closes off communication between a central cavity 107 in the valve body 98 and a collection chamber 108 communicating with the vent conduit 36. Since the central cavity 107 communicates with the outlet conduit 36, the vent valve member 104 removes a vent connection venting the reduction regulator 24 (FIG. 1). Conveniently, as shown in FIG. 2, the vent valve seat 106 comprises a multiple piece valve seat including a resilient elastomeric ring 110 based upon a rigid metal valve seat base 112. The ring 110 and base 112 have a construction and geometry preferably corresponding to the valve seat geometry disclosed in detail in copending application Ser. No. 85,151.

The vent valve 96 also includes a push rod 114 which extends downwardly into the central cavity 107 to bearingly engage a lost motion unit 116. That is, the push rod 114 engages a plate 118 from which a valve actuator 120 depends downwardly. The valve actuator 120 comprises a push rod type member which is maintained in vertically spaced relation above an impact plate 121 by a compression spring 122. Importantly, the spacing between the valve actuator 120 and the impact plate 121 is carefully chosen to be slightly less than the stroke length of the solenoid armature 94. That is, in a preferred embodiment, the spacing between the valve actuator 120 and the impact plate 121 is chosen to be about 0.040 inch with a solenoid armature stroke travel of about 0.045 inch. With this arrangement, during the initial and major portion of the solenoid armature stroke, lost motion occurs between the valve actuator 120 and the impact plate 121 resulting in compression of the spring 122 to store kinetic and potential energy in the spring. In this manner, the force load upon the solenoid winding and armature is initially low, whereby the armature begins movement substantially immediately upon energization of the winding 92 for rapid opening of the valve 100.

When the valve actuator 120 strokes the impact plate 121, the high pressure valve 100 is moved off its associated valve seat 124 to open high pressure fluid flow to the outlet conduit 36. That is, the high pressure valve 100 includes a valve stem 126 secured to the impact plate 121 and formed integrally with a high pressure valve head 128 of generally conical cross section. Impact of the valve actuator 120 with the impact plate 121 thus shifts the valve head 128 off its seat 124 to open the valve 100 to fluid flow. Conveniently, this valve seat 124 also comprises a multiple piece valve seat having a deformable resilient elastomeric ring 130 supported upon a rigid metal valve seat base 132. Again, this valve seat ring and base preferably are formed to have a construction and geometry generally corresponding with the geometry of the valve seat geometry disclosed in detail in copending application Ser. No. 85,151, including the provision of radial clearance surrounding the valve seat 124 to allow limited radial valve seat floating for self-centering alignment with the valve head 128.

The solenoid valve assembly 28 of this invention maximizes the capacity of the solenoid core 92 and armature 94 to open the high pressure valve 100. That is, during the initial, relatively low-force portion of the armature travel, kinetic and potential energy is stored in the spring 122 of the lost motion unit 116. During the latter, maximum power portion of the armature travel, the valve actuator 120 impacts the impact plate 121 directly to shift the high pressure valve head 128 from its seat 124. Importantly, the impact force comprises a summation of direct solenoid stroke energy during the maximum force portion of armature stroke together with energy stored by the spring 122 during the low-force portion of armature stroke. Once the valve head 128 lifts from its seat 124, the pressure differential across the seat is sufficiently removed or diminished so that further opening movement of the valve 100 is readily accomplished by means of remaining stored energy in the spring 122.

Thus, in operation, downward movement of the armature 94 substantially simultaneously operates the vent valve 96 and begins movement of the high pressure valve 100. The armature 94 moves the vent valve 96 to close off the vent connection to the outlet conduit 32, and at substantially the same time opens the high pressure valve 100 to couple high pressure fluid to the outlet conduit 32. In this manner, high pressure fluid is supplied to the pressure reduction regulator 24 (FIG. 1) and to the static reference pressure regulator 38 to initiate operation of the starting system 10. Of course, when the solenoid valve 28 is de-energized, the armature 94 retracts to carry the vent valve 96 to an open position to vent the downstream side of the high pressure valve 100. This allows the high pressure in the conduit 30 to close the high pressure valve 100 and open the vent valve 96. If desired, a compression spring 140 may be provided in engagement with the high pressure valve head to assist return thereof to a closed position.

A wide variety of modifications and improvements of the solenoid valve assembly of this invention are believed to be possible within the scope of the art. Accordingly, no limitation of the invention is intended by way of the description herein except as set forth in the appended claims.

What is claimed is:

1. A solenoid valve assembly comprising armature means movable through a predetermined stroke distance, said assembly being of the type wherein the electromotive force output on said armature means is relatively small upon initiation of stroke movement thereof and increases with stroke length; an impact member; compression spring means reacting between said armature means and said impact member for normally maintaining said armature means spaced from said impact member a distance at least slightly less than the armature means stroke distance; and a valve member movable by said impact member, said spring means being for storing stroke energy through an initial portion of armature means stroke and for summing the stored energy with stroke energy throughout a latter portion of armature means stroke upon impact with said impact member to move said valve member, and accelerate said valve member to a speed substantially greater than the speed of movement of said armature means.

2. The invention as set forth in claim 1 wherein said valve operably disposed with respect to a valve seat to open and close said valve seat to fluid flow.

3. The invention as set forth in claim 2 including means for normally biasing said valve member to a position closing said valve seat.

4. The invention as set forth in claim 2 wherein said valve member comprises a valve head having a generally conical cross section expanding through the valve seat and situated for seating upon the fluid flow inlet side of said valve seat, said armature means being for moving said valve member to a position opening said valve seat to fluid flow.

5. The invention as set forth in claim 4 wherein said valve seat is mounted for limited radial floating for self-centering with said valve head.

6. The invention as set forth in claim 1 including a solenoid winding energizable for translating said armature means through a linear stroke of predetermined length.

7. The invention as set forth in claim 1 wherein said armature means comprises an armature, and a valve actuator movable by said armature for impacting said impact member, said spring means reacting between said impact member and said valve actuator.

8. A solenoid valve assembly comprising armature means movable through a predetermined stroke distance, said assembly being of the type wherein the electromotive force output on said armature means is relatively small upon initiation of stroke movement thereof and increases with stroke length; a lost motion unit including a valve actuator movable by said armature means, an impact member, and compression spring means reacting between said actuator and impact member for normally maintaining said actuator and impact member spaced from each other a distance at least slightly less than the armature means stroke distance; and a valve member movable by said impact member, said spring means being for storing stroke energy through an initial portion of armature means stroke and for summing the stored energy with the stroke energy throughout a latter portion of armature means stroke upon impact of said impact means by said actuator to move said valve member, and accelerate said valve member to a speed substantially greater than the speed of movement of said armature means.

9. The invention as set forth in claim 8 wherein said valve member is operably disposed with respect to a valve seat to open and close said valve seat to fluid flow.

10. The invention as set forth in claim 9 wherein said valve member comprises a valve head having a generally conical cross section expanding through the valve seat and situated for seating upon the fluid flow inlet side of said valve seat, said armature means being for moving said valve member to a position opening said valve seat to fluid flow.

11. The invention as set forth in claim 10 wherein said valve seat is mounted for limited radial floating for self-centering with said valve head.

12. A solenoid valve assembly comprising an armature movable through a predetermined stroke distance, said assembly being of the type wherein the electromotive force output on said armature is relatively small upon initiation of stroke movement thereof and increases with stroke length; a first valve member movable by said armature; a lost motion unit including a valve actuator movable by said first valve member, an impact member, and compression spring means reacting between said actuator and impact member for normally maintaining said actuator and impact member spaced from each other a distance at least slightly less than the armature stroke distance; and a second valve member movable by said impact member, said spring means being for storing armature stroke energy through an initial portion of armature stroke and for summing the stored energy with stroke energy throughout a latter portion of armature stroke upon impact of said impact member to move said second valve member, and accelerate said second valve member to a speed substantially greater than the speed of movement of said armature.

13. The invention as set forth in claim 12 wherein said first valve member is operably disposed with respect to a first valve seat, and said second valve member is operably disposed with respect to a second valve seat, said armature being for substantially simultaneously moving said first and second valve members with respect to their associated valve seats.

14. The invention as set forth in claim 13 wherein said first and second valve seats are each mounted for limited radial floating for self-centering alignment with their associated valve member.

* * * * *